United States Patent [19]

Vitalune et al.

[11] Patent Number: 5,456,046
[45] Date of Patent: Oct. 10, 1995

[54] BOUQUET DISPLAY APPARATUS

[76] Inventors: Lillian R. Vitalune, 3127 Bradbury Dr., Aliquippa, Pa. 15001; Jill M. Jones, 361 Beaver St., Leetsdale, Pa. 15056

[21] Appl. No.: 278,800

[22] Filed: Jul. 22, 1994

[51] Int. Cl.⁶ ............................. A01G 5/00; A47G 7/00
[52] U.S. Cl. ........................................ 47/41.01; 248/214
[58] Field of Search ............................. 248/311.2, 224.4, 248/231.7, 214; 47/41.01, 41.11

[56] References Cited

U.S. PATENT DOCUMENTS

| | | | |
|---|---|---|---|
| D. 317,884 | 7/1991 | Spicer . | |
| 2,918,244 | 12/1959 | Laney | 248/214 |
| 3,027,014 | 3/1962 | Lindblom | 47/41.01 |
| 3,576,699 | 4/1971 | Meyer . | |
| 3,949,568 | 4/1976 | Gallagher . | |
| 3,991,961 | 11/1976 | Platzer, Jr. | 248/231.7 |
| 4,204,365 | 5/1980 | Hirvi . | |
| 4,739,582 | 4/1988 | Cullinane | 47/41.12 |
| 4,993,675 | 2/1991 | Walker | 248/311.2 |
| 5,007,612 | 4/1991 | Manfre | 248/231.7 |
| 5,058,358 | 10/1991 | Stratton | 248/214 |
| 5,070,644 | 12/1991 | Hasty . | |
| 5,129,140 | 6/1993 | Spykerman | 248/311.2 |
| 5,143,335 | 9/1992 | Frankel | 248/215 |
| 5,279,452 | 1/1994 | Huynh | 248/215 |

FOREIGN PATENT DOCUMENTS 0581868  10/1946  United Kingdom ................ 248/231.7

Primary Examiner—Ramon S. Britts
Assistant Examiner—Joanne C. Downs

[57] ABSTRACT

A bouquet display apparatus includes an adjustable clamp assembly which includes a medial strut portion. A pair of clamp portions extend transversely from the medial strut portion in a first direction. An adjustable jaw member is connected to one of the clamp portions. The clamp portions are spaced apart from each other on the medial strut portion such that the clamp portions are adapted to clamp onto an edge of a table top therebetween. A bracket assembly is attached to the medial strut portion and extends from the medial strut portion in a second direction. A skirt holder assembly is attached to the medial strut portion and extends from the medial strut portion in the second direction. The bracket assembly includes a bracket holder portion attached to the medial strut portion of the adjustable clamp assembly. A flower holder assembly is adapted for removable and replaceable connection to the bracket holder portion. The flower holder assembly may include a flower holder portion adapted for holding a linear array of flowers or may include a flower holder portion adapted for holding a circular arrangement of flowers. The adjustable jaw member includes a threaded shaft which is connected to a complementarily threaded channel in a clamp portion. The skirt holder assembly is connected to a medial strut portion adjacent to a second clamp portion. The first and second clamp portions are separated from each other by the medial strut portion.

5 Claims, 3 Drawing Sheets

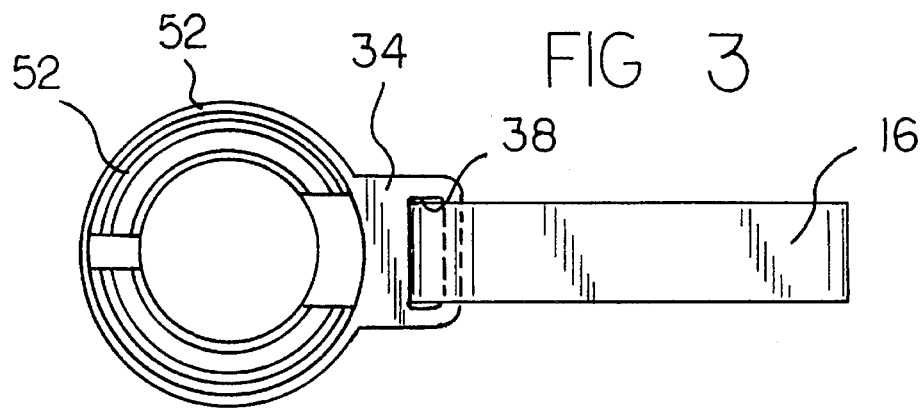
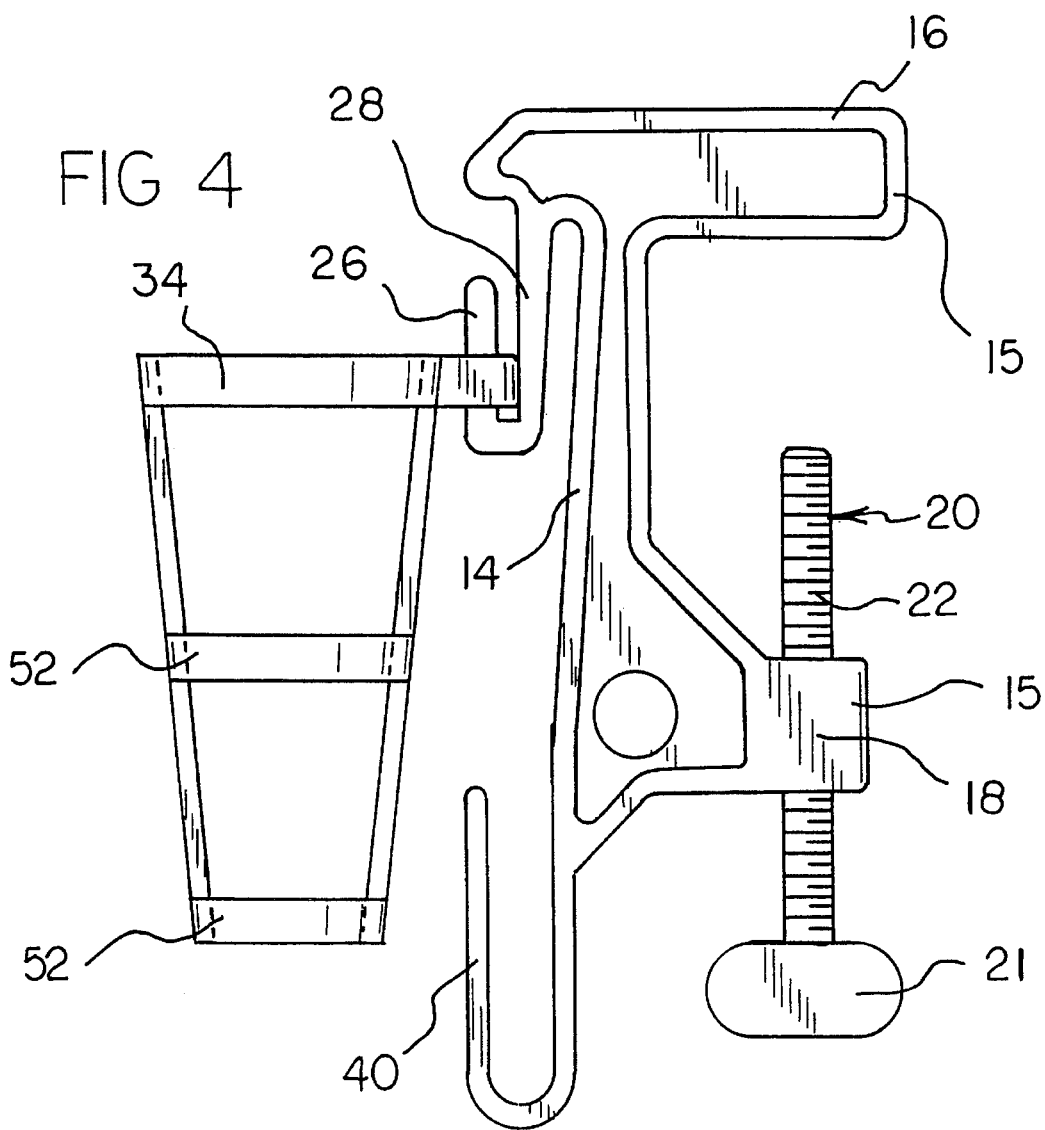

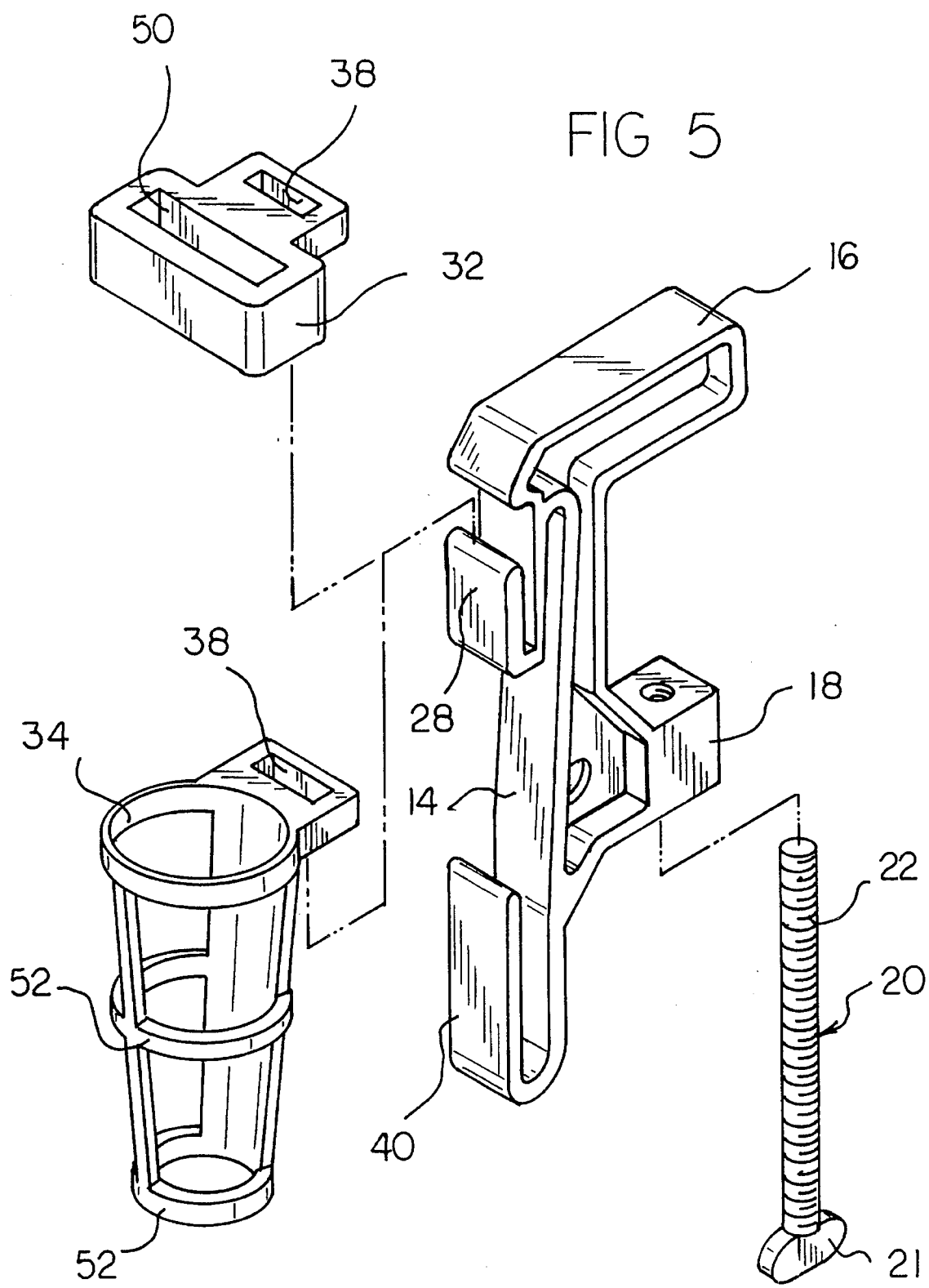

BOUQUET DISPLAY APPARATUS

BACKGROUND OF THE INVENTION

1. Field of the Invention

The present invention relates generally to devices for displaying flowers and, more particularly, to flower display devices especially adapted for displaying the flowers in association with a table.

2. Description of the Prior Art

Flowers are often displayed indoors by placing the flowers in a vase and placing the vase on a table top. Often, one would prefer not to clutter a table top with a vase, for the space taken up by the vase may be used for other purposes. In this respect, it would be desirable if a display for flowers were provided which does not employ a vase that is placed on a table top.

Although used for many occasions, flower bouquets are especially used in weddings. The bride and the bridesmaids generally carry flower bouquets during the marriage ceremony. After the ceremony, during the period of a wedding reception, the flower bouquets are often placed on a table top or other location, whereby substantial amounts of table top space are occupied by the flower bouquets. When placed on a table top, the flower bouquets are not readily seen by the persons at the reception, and the flower bouquets are underutilized. In this respect, it would be desirable if a display for flowers were provided which permitted flower bouquets to be displayed at a wedding reception without occupying substantial portions of table top space.

Generally, when flower bouquets are placed upon a table or other horizontal surface for storage, the flowers are not readily visible because they are lying in a horizontal orientation. To be more visible, the flower bouquets should be supported in a vertical orientation. In this respect, it would be desirable if a display for flowers were provided which displays the flowers in a vertical orientation.

When flowers are aggregated to form a flower bouquet, they are generally arrayed either in a linear array to form a linear bouquet or in a circular bunch to form a circular bouquet. In this respect, it would be desirable if a display for flowers were provided that were adapted to display either a linear bouquet or a circular bouquet.

When tables are used for wedding receptions or other parties, the tables are often covered with a table cloth and/or a table skirt. A table skirt generally hangs down from the top edge of the table. For aesthetic purposes, it may be desirable to raise portions of the bottom edge of the table skirt to an upper edge of the table. In this respect, it would be desirable if a display for flowers were provided which was also adapted to keep a bottom edge of a table skirt in an elevated position near an upper edge of the table.

Still other features would be desirable in a bouquet display apparatus. For example, for a bouquet display that is used at an upper edge of a table, it would be desirable if the display apparatus could be easily attached to or removed from the table without damaging the table. In addition, for tables that are covered with a table cloth and/or a table skirt, it would be desirable for a flower bouquet display device to be readily attachable and removable from a table without damaging the table cloth or table skirt.

Thus, while the foregoing body of prior art indicates it to be well known to use devices for displaying flower bouquets, the prior art described above does not teach or suggest a bouquet display apparatus which has the following combination of desirable features: (1) does not employ a vase that is placed on a table top; (2) permits flower bouquets to be displayed at a wedding reception or other party or occasion or for any decorative purpose or as a holding device for creating bouquets or decorations, without occupying substantial portions of table top space; (3) displays flowers in a vertical orientation; (4) is adapted to display either a linear bouquet or a circular bouquet; (5) is adapted to keep a bottom edge of a table skirt in an elevated position near an upper edge of a table; (6) is easily attached to or removed from a table without damaging the table; and (7) is readily attachable and removable from a table without damaging a table cloth or table skirt. The foregoing desired characteristics are provided by the unique bouquet display apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a bouquet display apparatus which includes an adjustable clamp assembly which includes a medial strut portion. A pair of clamp portions extend transversely from the medial strut portion in a first direction. An adjustable jaw member is connected to one of the clamp portions. The clamp portions are spaced apart from each other on the medial strut portion such that the clamp portions are adapted to clamp onto an edge of a table top therebetween. A bracket assembly is attached to the medial strut portion and extends from the medial strut portion in a second direction. A skirt holder assembly is attached to the medial strut portion and extends from the medial strut portion in the second direction.

The bracket assembly includes a bracket holder portion attached to the medial strut portion of the adjustable clamp assembly. A flower holder assembly is adapted for removable and replaceable connection to the bracket holder portion.

The flower holder assembly may include a flower holder portion adapted for holding a linear array of flowers. The flower holder assembly may include a flower holder portion adapted for holding a circular arrangement of flowers wherein three rings are in gradually decreasing diameter from top to bottom.

The pair of clamp portions includes a first clamp portion extending transversely from a top portion of the medial strut portion in a first direction and a second clamp portion extending transversely from a bottom portion of the medial strut portion in the first direction. The adjustable jaw member includes a threaded shaft which is connected to a complementarily threaded channel in the second clamp portion.

The skirt holder assembly is connected to the medial strut portion adjacent to the second clamp portion. The bracket holder portion includes a hook, and the flower holder assembly includes an eye adapted to receive the hook for supporting the flower holder assembly.

The second direction in which the bracket assembly and the skirt holder assembly extend is opposite to the first direction in which the first clamp portion and the second clamp portion extend. The medial strut portion, the first clamp portion, the second clamp portion, the bracket holder portion, and the skirt holder assembly may be a one-piece structure.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bouquet display apparatus which has all of the advantages of the prior art and none of the disadvantages.

It is another object of the present invention to provide a new and improved bouquet display apparatus which may be easily and efficiently manufactured and marketed.

It is a further object of the present invention to provide a new and improved bouquet display apparatus which is of durable and reliable construction.

An even further object of the present invention is to provide a new and improved bouquet display apparatus which is susceptible of a low cost of manufacture with regard to both materials and labor, and which accordingly is then susceptible of low prices of sale to the consuming public, thereby making such bouquet display apparatus available to the buying public.

Still yet a further object of the present invention is to provide a new and improved bouquet display apparatus which does not employ a vase that is placed on a table top.

Still another object of the present invention is to provide a new and improved bouquet display apparatus that permits flower bouquets to be displayed at a wedding reception or other party without occupying substantial portions of table top space.

Yet another object of the present invention is to provide a new and improved bouquet display apparatus which displays flowers in a vertical orientation.

Even another object of the present invention is to provide a new and improved bouquet display apparatus that is adapted to display either a linear bouquet or a circular bouquet.

Still a further object of the present invention is to provide a new and improved bouquet display apparatus which is adapted to keep a bottom edge of a table skirt in an elevated position near an upper edge of a table.

Yet another object of the present invention is to provide a new and improved bouquet display apparatus that is easily attached to or removed from a table without damaging the table.

Still another object of the present invention is to provide a new and improved bouquet display apparatus which is readily attachable and removable from a table without damaging a table cloth or table skirt.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is an enlarged top view of the embodiment of the bouquet display apparatus of FIG. 2.

FIG. 4 is an enlarged side view of a second embodiment of the invention.

FIG. 5 is an exploded perspective view of the embodiment of the invention shown in FIG. 4, further including an alternative bouquet holder.

DESCRIPTION OF THE PREFERRED EMBODIMENT

Figure 1:
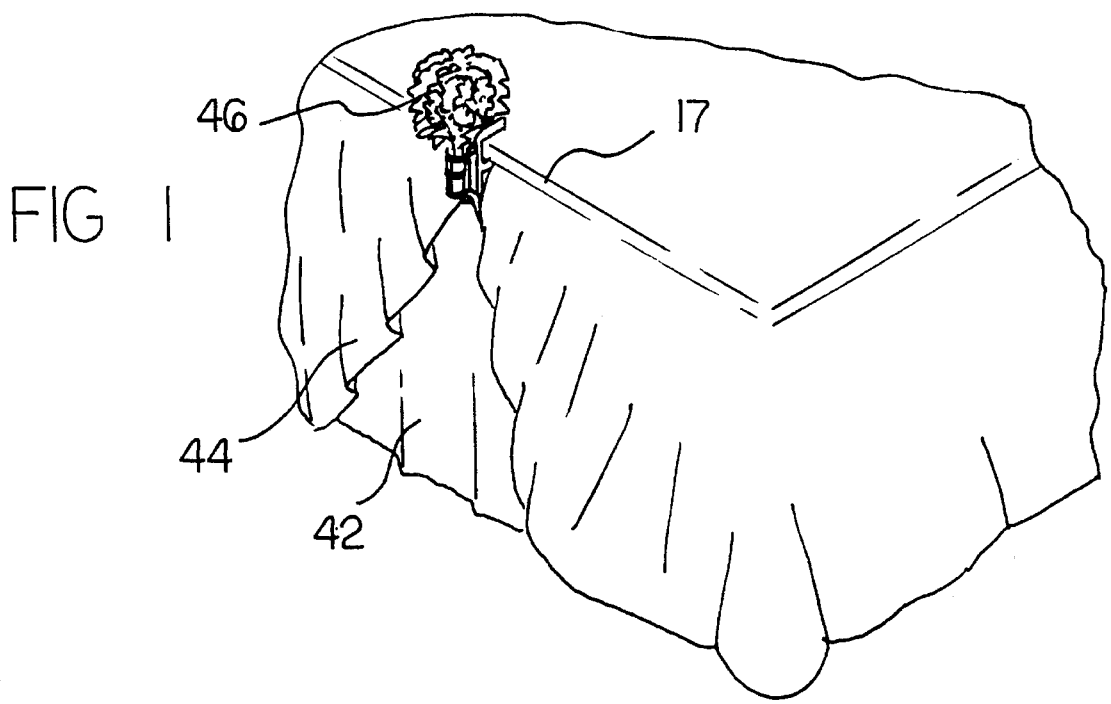
FIG. 1 is a perspective view showing a preferred embodiment of the bouquet display apparatus of the invention clamped to a table having a table cloth and table skirt.

With reference to the drawings, a new and improved bouquet display apparatus embodying the principles and concepts of the present invention will be described.

Turning to FIGS. 1–4, there is shown an exemplary embodiment of the bouquet display apparatus of the invention generally designated by reference numeral 10. In its preferred form, bouquet display apparatus 10 includes an adjustable clamp assembly 12 which includes a medial strut portion 14. A pair of clamp portions 15 extend transversely from the medial strut portion 14 in a first direction. An adjustable jaw member 20 is connected to one of the clamp portions 15. The clamp portions 15 are spaced apart from each other on the medial strut portion 14 such that the clamp portions 15 are adapted to clamp onto an edge of a table top 17 therebetween. A bracket assembly 26 is attached to the medial strut portion 14 and extends from the medial strut portion 14 in a second direction. A skirt holder assembly 40 is attached to the medial strut portion 14 and extends from the medial strut portion 14 in the second direction.

The bracket assembly 26 includes a bracket holder portion 28 attached to the medial strut portion 14 of the adjustable clamp assembly 12. A flower holder assembly is adapted for removable and replaceable connection to the bracket holder portion 28. The flower holder assembly may include a flower holder portion 32 adapted for holding a linear array of flowers.

Figure 2:
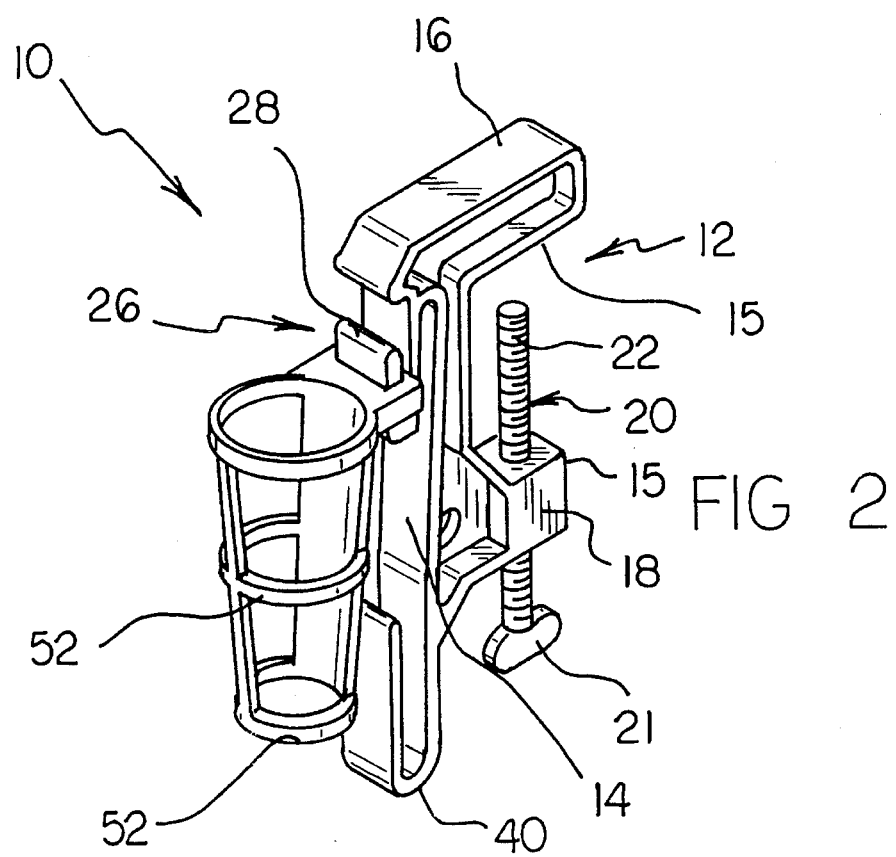
FIG. 2 is an enlarged perspective view of the embodiment of the bouquet display apparatus shown in FIG. 1.

As shown in FIG. 5, in accordance with another embodiment of the invention, the flower holder portion 32 that is adapted for holding a linear array of flowers includes a linear slot 50. Also as shown in FIG. 5, the flower holder assembly may include a flower holder portion 34 adapted for holding a circular arrangement of flowers. The flower holder portion 34 that is adapted for holding a circular arrangement of flowers includes a plurality of rings 52, as shown in FIGS. 2 and 4. Three rings 52 are in gradually decreasing diameter from top to bottom.

The pair of clamp portions 15 includes a first clamp portion 16 extending transversely from a top portion of the medial strut portion 14 in a first direction and a second clamp portion 18 extending transversely from a bottom portion of the medial strut portion 14 in the first direction. The adjustable jaw member 20 includes a threaded shaft 22 which is connected to a complementarily threaded channel 24 in the second clamp portion 18. The adjustable jaw member 20 also includes a knob 21 for turning the threaded shaft 22.

The skirt holder assembly 40 is connected to the medial strut portion 14 adjacent to the second clamp portion 18. The bracket holder portion 28 includes a hook 28, and the flower holder assembly includes an eye 38 adapted to receive the hook 28 for supporting the flower holder assembly.

The second direction in which the bracket assembly 26 and the skirt holder assembly 40 extend is opposite to the first direction in which the first clamp portion 16 and the second clamp portion 18 extend. The medial strut portion 14, the first clamp portion 16, the second clamp portion 18, the bracket holder portion 28, and the skirt holder assembly 40 are a one-piece structure.

There are a number of ways to use the bouquet display apparatus of the invention. When only a table cloth 42 is present, the bouquet display apparatus 10 is clamped onto the table top 17 on top of the table cloth, and a bouquet 46 of flowers is placed in the bouquet display apparatus 10. To clamp the bouquet display apparatus 10 onto a table top 17, the knob 21 is grasped to spin the threaded shaft 22 down away from the first clamp portion 16. The first clamp portion 16 and the threaded shaft 22 are placed over the edge of the table top 17, then the knob 21 is grasped to spin the threaded shaft 22 toward the first clamp portion 16 with the table top 17 sandwiched therebetween. This is how the adjustable clamp assembly 12 is clamped onto the table top 17. To remove the adjustable clamp assembly 12, the knob 21 is spun in the opposite direction to lower the threaded shaft 22 from the table top 17. When only a table skirt 44 is present, the skirt holder assembly 40 is used, as shown in FIG. 1, to retain the bottom edge of the table skirt 44 in an elevated position. More specifically the skirt holder assembly 40 retains a bunched up portion of the table skirt 44 between the top of the table and the bottom edge of the table skirt 44.

As shown in FIG. 1, when both a table cloth 42 and a table skirt 44 are employed, the table cloth 42 is first placed on the table. Then the bouquet display apparatus 10 is clamped onto the edge of the table top 17, as described above. Then the edge of the table skirt 44 is lifted and placed in the skirt holder assembly 40. When the lower edge of the table skirt 44 is placed in the skirt holder assembly 40, a cascading effect is obtained.

A plurality of bouquet display apparatuses 10 of the invention can be placed along the top edge of the table top 17 at measured intervals. Then, different portions of the table skirt 44 can be bunched up and placed in the respective skirt holder assemblies 40 of the bouquet display apparatuses 10 to provide a multiple cascading effect. Once a bouquet display apparatus 10 has been clamped onto a table top 17, a bow can be attached to disguise the bouquet display apparatus 10.

The components of the bouquet display apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved bouquet display apparatus that is low in cost, relatively simple in design and operation, and which may advantageously be used without employing a vase that is placed on a table top. With the invention, a bouquet display apparatus is provided which permits flower bouquets to be displayed at a wedding reception or other party without occupying substantial portions of table top space. With the invention, a bouquet display apparatus is provided which displays flowers in a vertical orientation. With the invention, a bouquet display apparatus is provided which is adapted to display either a linear bouquet or a circular bouquet. With the invention, a bouquet display apparatus is provided which is adapted to keep a bottom edge of a table skirt in an elevated position near an upper edge of a table. With the invention, a bouquet display apparatus is provided which is easily attached to or removed from a table without damaging the table. With the invention, a bouquet display apparatus is provided which is readily attachable and removable from a table without damaging a table cloth or table skirt.

Thus, while the present invention has been shown in the drawings and fully descried above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A bouquet display apparatus, comprising:
an adjustable clamp assembly which includes a medial strut portion, a pair of clamp portions extending transversely from said medial strut portion in a first direction, and an adjustable jaw member connected to one of said clamp portions, wherein said pair of clamp portions includes a first clamp portion extending transversely from a top portion of said medial strut portion in a first direction and includes a second clamp portion extending transversely from a bottom portion of said medial strut portion in the first direction, wherein said clamp portions are spaced apart from each other on said medial strut portion such that said clamp portions are adapted to clamp onto an edge of a table top therebetween, wherein said adjustable law member includes a shaft connected to a complementarily engaging channel in said second clamp portion, a bracket assembly attached to said medial strut portion, extending from said medial strut portion in a second direction, wherein said second direction is opposite to said first direction, wherein said bracket assembly is attached to said medial strut portion adjacent to said first clamp portion, wherein said bracket assembly includes a bracket holder portion attached to said medial strut portion of said adjustable clamp assembly and includes a flower holder assembly adapted for removable and replaceable connection to said bracket holder portion, and a skirt holder assembly attached to said medial strut portion, said skirt holder assembly including a hook portion extending from said medial strut portion in said second direction, wherein said skirt holder assembly is attached to said medial strut portion adjacent to said second clamp portion.

2. The apparatus of claim 1 wherein said flower holder assembly includes a flower holder portion which includes a linear slot adapted for holding a linear array of flowers.

3. The apparatus of claim 1 wherein said flower holder assembly includes a circular flower holder portion adapted for holding a circular arrangement of flowers.

4. The apparatus of claim 1 wherein:

said bracket holder portion includes a hook, and said flower holder assembly includes an eye adapted to receive said hook for supporting said flower holder assembly.

5. The apparatus of claim 1 wherein said medial strut portion, said first clamp portion, said second clamp portion, said bracket holder portion, and said skirt holder assembly are a one-piece structure.

* * * * *